Figure 1A:
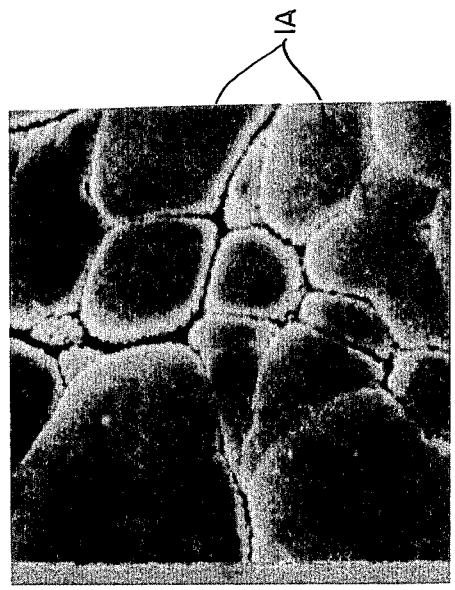

United States Patent [19]

Robinson

[11] Patent Number: 4,484,988

[45] Date of Patent: Nov. 27, 1984

[54] PROCESS FOR PROVIDING METALLIC ARTICLES AND THE LIKE WITH WEAR-RESISTANT COATINGS

[75] Inventor: W. W. Robinson, Richmond, Va.

[73] Assignee: Richmond Metal Finishers, Inc., Richmond, Va.

[21] Appl. No.: 328,913

[22] Filed: Dec. 9, 1981

[51] Int. Cl.³ .......................... C25D 5/34; C25D 5/48

[52] U.S. Cl. .................. 204/35.1; 204/37.1; 204/38 R; 204/38 B; 204/38 E

[58] Field of Search .............. 204/37 R, 37 T, 35 R, 204/35 N, 38 B, 38 S, 38 R, 38 E; 428/411, 422, 463; 427/374.1, 376.6, 376.8, 383.9, 388.1, 398.1, 398.3, 398.4, 409, 437, 438

[56] References Cited

U.S. PATENT DOCUMENTS

| Re. 29,285 | 6/1977 | Christini et al. | 428/426 |
|---|---|---|---|
| 1,849,293 | 3/1932 | Gray | 204/45 |
| 1,965,251 | 7/1934 | Murray et al. | 204/1 |
| 2,197,365 | 4/1940 | Kjerrman | 148/21 |
| 2,287,948 | 6/1942 | Smart | 204/45 |
| 2,358,029 | 9/1944 | Phillips et al. | 204/45 |
| 2,412,058 | 12/1946 | Pfeil | 204/141 |
| 2,497,988 | 2/1950 | Green et al. | 204/45 |
| 2,532,283 | 12/1950 | Brenner et al. | 117/50 |
| 2,567,791 | 9/1951 | Sefing | 148/21.7 |
| 2,621,988 | 12/1952 | Donley | 308/237 |
| 2,658,841 | 11/1953 | Gutzeit et al. | 1.7/130 |
| 2,691,814 | 10/1954 | Tait | 29/182.5 |
| 2,949,392 | 8/1960 | Willey | 148/125 |
| 2,978,319 | 4/1961 | Chang | 75/128 |
| 2,990,296 | 6/1961 | Hoke | 117/130 |
| 3,045,334 | 7/1962 | Berzins | 29/194 |
| 3,052,590 | 9/1962 | Maros et al. | 156/289 |
| 3,073,761 | 1/1963 | Covino | 204/38 |
| 3,088,889 | 5/1963 | Boda et al. | 204/143 |
| 3,091,549 | 5/1963 | Kanter | 117/75 |
| 3,096,182 | 7/1963 | Berzins | 106/1 |
| 3,123,505 | 3/1964 | Pocock | 148/6.2 |
| 3,128,175 | 4/1964 | Nagy et al. | 75/126 |
| 3,185,600 | 5/1965 | Dullberg | 148/125 |
| 3,211,325 | 10/1965 | Wisnicki | 220/64 |
| 3,234,031 | 2/1966 | Zirngiebl et al. | 106/1 |
| 3,254,011 | 5/1966 | Zaremski | 204/140.5 |
| 3,279,936 | 10/1966 | Forestek | 117/2 |
| 3,338,726 | 8/1967 | Berzins | 106/1 |
| 3,347,760 | 10/1967 | McKelvie | 204/140.5 |
| 3,373,054 | 3/1968 | Lang et al. | 117/130 |
| 3,389,060 | 6/1968 | Greene | 204/26 |
| 3,485,683 | 12/1969 | Schelleng et al. | 148/125 |
| 3,490,924 | 1/1970 | Manson et al. | 106/1 |
| 3,674,447 | 7/1972 | Bellis | 29/196.6 |
| 3,716,348 | 2/1973 | Perkins | 29/195 |
| 3,726,773 | 4/1973 | Lamb et al. | 204/129.35 |
| 3,819,428 | 6/1974 | Moore | 148/125 |
| 3,891,477 | 6/1975 | Lance et al. | 148/125 |
| 4,114,505 | 9/1978 | Loeser et al. | 85/1 |
| 4,259,409 | 3/1981 | Arnold | 428/428 |

FOREIGN PATENT DOCUMENTS 912793  12/1962  United Kingdom ............... 428/422

OTHER PUBLICATIONS

F. A. Lowenheim, *Electroplating*, McGraw-Hill Book Co., New York, 1978 p. 129.

"Custom Multi-Coating Service", Ti-Coatings, Inc., Mt. Clemens, Michigan.

"TFE-Lok What it is . . . ", The Forester Plating & Mfg. Co., Cleveland, Ohio.

"Electroless Nickel-Boron Alloy Coatings–Their Industrial Applications", D. P. Williams, Institute of Metal Finishing, 5/13/77.

"Coatings That Fight Wear", Richard T. Dann, *Machine Design*, General Magnaplate Corporation, Linden, New Jersey.

"Hard Tool Coatings Improve Wear", *Tooling & Production*, Mar., 1981.

*Primary Examiner*—G. L. Kaplan
*Assistant Examiner*—W. T. Leader
*Attorney, Agent, or Firm*—Rines and Rines, Shapiro and Shapiro

[57] ABSTRACT

This disclosure is concerned with providing metallic articles, such as cutting and drilling tools, gears, bearings and other structures subject to wear in use, with wear-resisting coatings adhered at desired surfaces thereof, preferably in the form of a thin, generally fractional mil, nickel-boron porous deposit within the voids and over the surface of which a molten mixture of soft metal and organic plastic material of low friction coefficient has been adhered. Improved properties are imparted by cryogenic treatment.

15 Claims, 3 Drawing Figures

PROCESS FOR PROVIDING METALLIC ARTICLES AND THE LIKE WITH WEAR-RESISTANT COATINGS

The present invention relates to processes for adhering wear-resistant coatings of substantial hardness and low mechanical friction and wear properties to predetermined surfaces of metallic articles, including ferrous and other metals and alloys thereof, such as are used, for example, in forming, cutting and drilling tools, gears, bearings and other structures subject to wear; the invention being more particularly directed to processes for novel coatings of electrochemically deposited alloys of nickel or cobalt or the like with boron or phosphorous or the like as derived from catalytic reducing agents, including hydrides of boron or phosphorous salts. Improved wear-resistant metallic articles provided with such coatings by the novel processes herein are also within the purview of the invention.

Prior metal-coating techniques and formulations for depositing nickel-boron coatings and the like upon metallic surfaces and the like are disclosed, for example, in U.S. Pat. Nos. 3,045,334; 3,096,182; 3,338,726; 2,658,841; and 3,674,447 and patents and references cited therein. Work with nickel-boron and nickel-phosphorous coatings and comparisons with chromium is described also in "Electroless Nickel-Boron Alloy Coatings—Their Industrial Applications", a paper presented at the May 13, 1977 conference of the Institute of Metal Finishing by D. P. Williams.

In such prior applications, the art has heretofore considered that it was important to deposit such coatings in sufficient thickness (generally a few mils or greater—at least about 2 mils) to insure strong adhesion to the metallic surface, and a high-hardness, pore-free coating with corrosion-and wear-resistant and friction-reducing properties. Heat-treatment of the coating has been found to increase hardness desirably.

Prior approaches to the problem of providing wear-resistant coatings to metallic surfaces have involved a wide variety of techniques including hardening by radiation or flame, plating, carburizing (particularly for steel), carbonnitriding, boronizing and anodizing as summarized, for example, in a paper entitled "Coatings That Fight Wear" by Richard T. Dann, reprinted from Machine Design and currently published by General Magnaplate Corporation of Linden, N.J. Electroplating, case hardening, chemical and vapor deposition and plasma and salt bath techniques are also described in a paper entited "Hard Tool Coatings Improve Wear", appearing in Tooling & Production magazine, March, 1981, stressing advantages of titanium carbide and nitride coatings on high-speed tool steel. Such coatings are also described in the bulletin of Ti-Coatings Inc. of Mt Clemens, Mich., entitled "Custom Multi-Coating Service". The proposal to use polytetrafluoroethylene locked into a hard chromium electrodeposited surface is another approach described in the 1981 bulletin entitled "TFE-Lock What it is . . . " of The Forester Plating & Mfg Co. of Cleveland, Ohio.

Proposals also have been made for covering nickel coatings on ferrous metals and aluminum with polytetraflouroethylene with heat fusing the same to obtain an abrasion resistant self-lubricating surface, as described in U.S. Pat. No. 3,716,348. In accordance with the prefererred embodiment of the present invention, however, it has been found that the mixing with a soft metal lubricant such as indium in fusing the polytetraflouroethelyne or similar organic lubricant provides much improved results, particularly when merged into a porous nickel or cobalt hard coating.

Other patents called to applicant's attention which demonstrate the struggles of the art to solve this type of problem prior to the present invention include: U.S. Pat. Nos. 3,891,477; 2,567,791; 3,726,773; 2,412,058; 4,114,505; 2,197,365; 2,949,392; 2,978,319; 3,128,175; 3,185,600; 3,485,683; 3,819,428; 3,088,889; 3,254,011; 3,347,760; U.S. Pat. No. Re. 29,285; U.S. Pat. Nos. 2,532,283; 2,990,296; 3,234,031; 3,338,726; 3,373,054; 3,490,924; 1,849,293; 1,965,251; 2,287,948; 2,358,029; 2,497,988; 3,389,060; 2,691,814; 3,052,590; 3,091,549; 3,123,505 and 3,279,936.

Underlying the present invention are several discoveries apparently not known to prior workers in this art, including an important feature residing in the decided desirability, not undesirability, of deliberately maintaining substantial porosity in, for example, the nickel-boron coating; and at that, using generally much thinner coatings than previously employed and filling such pores or voids with additional soft-metal and organic lubricant materials in molten form that remarkably improve the corrosion- and wear-resisting properties and life of these coatings in frictional usages. The treatment of the invention, indeed, alters surface chemistry through the use of such a combination of hardmetal coatings with soft-metal coatings and organic lubricants in a unified system, with the total treatment also improving metallurgical properties through the realignment of crystal structures and more complete phase transformations.

An object of the invention, accordingly, is to provide a new and improved metallic surface coating process, as of the nickel-boron or similar type, wherein a deliberately porous or spongey deposition is achieved and additional coating steps with combinations of soft metal and/or organic lubricants are performed that provide vastly improved wear-resistant and similar coating properties.

A further object is to provide such a novel prooess with additional performance-improving steps, including one or more of cryogenic cooling of the heat-treated coating, and the use of very thin nickel-boron or similar depositions Still another object is to provide novel coated metallic surfaces with improved corrosion, wear and friction-resisting properties resulting from treatment by the processes of the invention.

Other and further objects will be explained hereinafter and are more particularly delineated in the appended claims.

In summary, however, from one of its important viewpoints, the invention embraces a process for imparting improved wearing and friction-resistant surfaces to metallic articles and the like, that comprises, immersing a prepared article surface in a catalytic nucleation plating bath containing a nickel salt and a borohydride reducing agent and adjusting the plating to effect a nickel-boron coating at a deposition rate of the order of about half to a few mils per hour which would normally result in a strongly adhering, hard, nucleated, low porosity coating of the order of a few mils thickness after at least an hour or more of deposition; discontinuing the plating nucleation at a fraction of such hour where the coating has adhered to said article surface as a coating of thickness of the order of a small fraction of a mil, but still retains voids that provide a porosity of the order of about 20% to 50% more or less to provide a porous surface; heat-treating said surface; electrodepositing a thin soft metal deposit upon the said porous surface; applying a low friction coefficient organic lubricant material to the porous surface; further heat-treating the same to diffuse the soft metal therethrough and to cause the organic material and soft metal to flow in molten combined form within the voids of and over the total area of the porous surface, merging therewith; and cooling the article. From another viewpoint, the invention also involves a metallic surface having a wear-improved surface to which is adhered a thin fractional mil nickel-boron porous coating the voids of which are filled with, and the surface of which is coated by, a hardened molten mixture of a soft metal and a low friction coefficient organic plastic material. Preferred or best mode embodiments are hereinafter presented.

The invention will now be described with reference to the accompanying drawing.

Figure 1B:
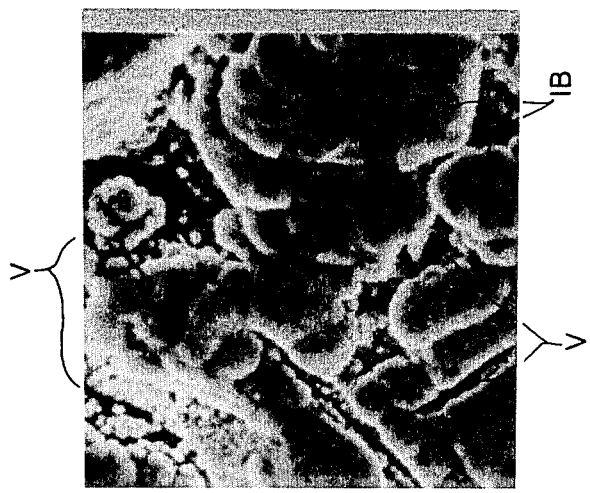
Figure 2:
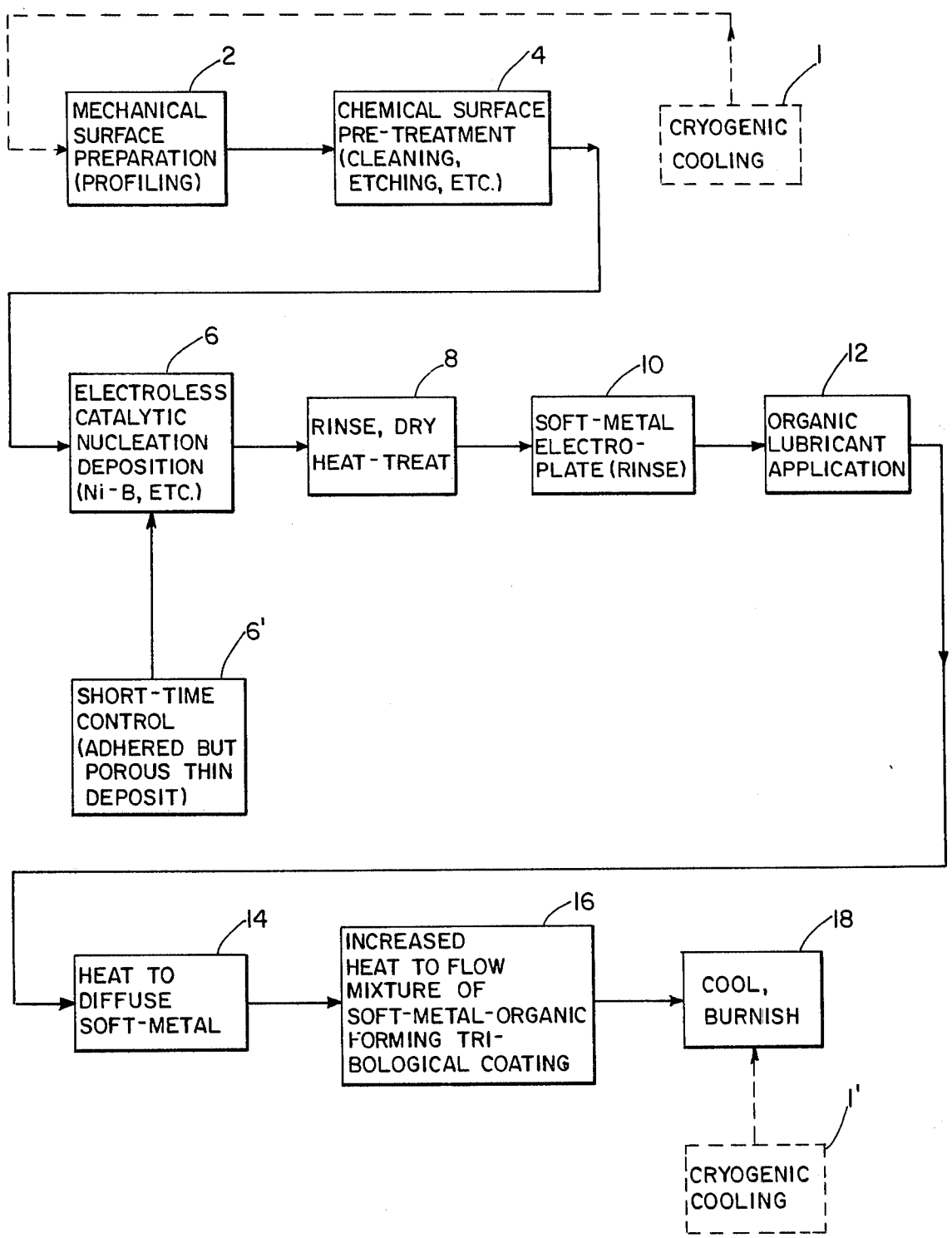

FIGS. 1A and 1B of which are reproductions of photomicrographs of prior art coatings and initial porous coatings used in accordance with the presen invention, respectively; and FIG. 2 is a flow chart of preferred process steps.

Referring to the drawing, FIG. 1A illustrates the typical micrographic nature of a prior art 2 mil nickel-boron coating resulting after about one hour of deposition upon a prepared metallic surface by the processes of the before-mentioned nickel-boron patents. The hard amporphous coating 1A is almost continuous, with only boundary lines of adjacent solid conglomerates observable, substantially pore or void free—the objective, indeed, of the prior art.

In FIG. 1B, on the other hand, by discontinuing the plating in a fraction of an hour in about ten minutes, in the same bath as in FIG. 1A, the nickel-boron coating 1B has been found to still be securely adhered to the metallic surface thereunder, but at this stage is still full of voids or pores—about 20% porous, more or less, in this instance. The spongey coating 1B, moreover is only about a 0.07 mil, in thickness, a very small fraction of conventional coatings.

It is with this type of small fractional hour deposition, and fractional mil nucleation deposits, with rates of the order of from about half to a few mils per hour, say 0.5–0.7 mils/hr., more or less, that the process of the invention then proceeds to attain its improved results.

Referring to FIG. 2, following conventional mechanical surface preparation or profiling steps 2, including grit-blasting for appropriate rounding off of irregularities and the like, and chemical surface pre-treatment, as with cleaning and etching and similar techniques, represented at 4, the article is shown applied at 6 to the electroless catalytic nucleation bath, as of the before-mentioned nickel salt-borohydride type of said patents and Williams article, with a time control at 6' to stop the deposition after the Ni-B alloy has adhered to the metal article as a fractional mil coating but is still, say 20% to 50% more or less, porous or spongey. It is then preferred, following rinsing and drying, to heat treat the Ni-B metallized thin film or coating on the article surface at 8 to improve coating-to-base metal integrity and favorably alter metallurgical properties of the coating including hardening the same over a range of, for example, from about 58–62 Rockwell "C" to 70–72 "RC", while diffusing materials from the coating into the base metal for good bonding and slight hardening of the substrate to improve load bearing properties. Heat-treatment 8 at temperatures of the order of about 650° F. has been found to enable the attainment of these results.

In accordance with the invention, one or preferably both of soft-metal and low friction coefficient, high temperature dry organic lubricants are applied to the Ni-B coat as will now be described, being caused to meltingly diffuse into the voids of the porous Ni-B coating or film and over the area of the same, to merge therewith, and produce a resultant coating of enhanced boundary lubrication properties in a tribological way.

As shown in the exemplary and preferred embodiments of FIG. 2, there is electroplated upon the heat-treated thin metallic (Ni-B) film or coating on the prepared metallic article surface, a soft-metal lubricant, such as indium (Iota), at 10. It is preferred that the deposited soft metal layer be of thickness less than that of the thin metallized (Ni-B) coating; namely, of the order of 0.03 mil in thickness. This is later heated at 14 to above the melting point of the soft metal lubricant (preferably at about 325° F. and held there for about an hour or so to diffuse the indium or other soft metal throughout the Ni-B porous coating including within the voids or pores thereof. This soft-metal lubricant application serves to provide continuous lubricious film over the metallized coating, penetrates into the porosity thereof, improving the properties of the coating while providing a compatible wear couple with other materials. The penetration of the indium into the voids and intersticies and onto the surface of the coating "skeleton", in effect makes an amalgam of soft metal in a matrix of the hard Ni-B metal, which provides desirable complex lubrication and load bearing properties. Data on soft metal lubricants have indicated that when used in a conventional manner, coefficient of friction is generally at a minimum at film thickness of 0.01 mil. Thicker films normally result in large areas of contact and gradually increase the coefficient of friction. Thinner films may result in abrupt increases in coefficient of friction since they do not prevent substrate contact and formation of junctions. Tests with the coatings of the invention on cutting tools, later in part described, have indicated that soft-metal films in the order of about 0.03 mils give optimum results when used with the fractional mil (0.07) Ni-B coating, thus deviating from the norm.

With the preferred application of the low friction coefficient, high temperature organic lubricant materials, such as of the polytetrafluoroethylene type ("Teflon"), indicated at 12, in an even smaller layer than the soft metal (preferably of the order of about 0.01 mil in thickness), still additional lubrication properties are added to the system, with the organic lubricant providing a chemically compatible wear couple with the other materials. The increased heating at a higher temperature above the melting point of the organic lubricant (preferably at a temperature of the order of about 580°–600° F. for polytetrafluoroethylene) as shown at 16, causes a molten mixing, flow, and fusion, until there is blending with the soft metal and filling the voids and fissures of the hard metal coating, providing a reservoir of lubricant after initial surfaces are removed in the wear process. The organic lubricant is selected for wetting properties, such as oleophilic, hydrophobic, etc. and very low coefficient of friction. Since the selected fluorocarbon, for example, attains a true melt and has the properties almost of a penetrating oil, such materials have the ability to flow into normally impenetratable areas. Used alone, such materials are little more than a wax or mold release; but utilized in this very different manner in the process of the invention, they provide properties not easily attainable through known current fluoropolymers.

The process then proceeds to cooling of the tribological hard, once porous metal-soft metal lubricant-organic lubricant coating at 18, followed by burnishing, if desired, to remove excess organic material and/or burrs or particles on the surface and to improve appearance. Heat and pressure from a burnishing operation, moreover, cause the soft metal and organic lubricant further to penetrate into the pores and fissures of the skeleton of the hard metal coating, making a general all-around improvement in the integrity of the system both functionally and aesthetically.

It has been determined that beneficial microstructure realignment, stress relief and other improved properties can be obtained through cryogenic cooling, as effected in dry vacuum for, say, 24 hours more or less, at a temperature of about $-320°$ F. In FIG. 2, this is shown optionally applied at the beginning of the process at 1, or after the coating of the invention has been prepared upon the metallic article surface, at 1'. If initially effected at 1, a more complete transformation of retained austinite can be attained with realignment of stacking faults and other high energy subsurface crystal structure faults, and while advantageously forming additional carbides and/or nitrides). Certain materials such as M-2, M-7, D-2, 52100, and other high alloy steels, respond very favorably to this treatment, providing greater "toughness", less chipping of edges, less potential subsurface delamination, higher wear resistant surfaces and greater metallurgical stability. This serves to provide a superior substrate for subsequent surface films.

With the cryogenic cooling carried out at or near the end of the process, as at 1', however, it has been found that the properties of the coating are also significantly improved for wear-resistance uses and the like. The cryogenic cooling improvement, moreover, while particularly useful with the fractional mil once porous Ni-B or similar hard coatings of the invention, is also useful with prior art Ni-B and similar hard substantially non-porous coatings on metallic articles and the like, as well. While the Ni-B coating is a preferred embodiment, as before intimated, the process of the invention is also useful with other materials, known to be substantially equivalent or very similar in properties and performance for the applications of the invention. Well-known cobalt instead of nickel salts may, for example, be used in the electroless or other deposition bath and well-known phosporous-containing reducing agents may be substituted for the boron hydrides, as described in the previously mentioned patents and article. Useful reducing agents are dimethylamine borane, sodium borohydride and sodium hypophosphite. Other soft metal lubricants than indium include lead, tin, silver, gold, etc.; and other dry lubricants than the fluorocarbons include molydisulfide.

What is important is that, in the preferred form of the invention, the metallizing treatment of the surface of the metallic article be effected as a thin metallic film upon a prepared surface for providing lubricious, hard, and wear-resistant properties on the bearing surface; and in best mode, metallic film thicknesses on porous "skeleton" of about $0.00007'' \pm 0.00002''$ on all critical surfaces. The hardness of the metallic film can be heat-treated, as before stated, to 70-72 Rockwell "C" (hardness of chromium plating, providing a metallic film with inherent lubricity and low coefficient of friction and resulting in excellent boundary layer lubrication properties. The thinness of the coating film and uniformity makes it effectively a "non-dimensional" treatment, and the film has excellent and greatly enhanced bearing properties because of the thinness factor. The porosity of the coating is a result of dispersion of nucleation sites and dendritic growth from these sites, with discontinuousness or voids providing "unplated" areas which act as a reservoir for the subsequent lubrication coatings. The thinness of the film, moreover, causes the load bearing characteristics to act just like the base metal from a standpoint of subsurface deformation characteristics. This takes much of the shear stress of friction vectors from the film-to-base metal interface and distributes it down into the base metal substrate and thus takes advantage of that metal's mechanical properties. Such techniques, indeed, will bond to most metallic and even some non-metallic substrates, providing a hard, porous (spongey), lubricious skeleton ideally suitable for subsequent treatments of added soft metal and/or organic lubricants, while maintaining a thin film nature best suited by a solid film lubricant.

Certain exemplary illustrations are in order.

EXAMPLE 1

As before described, the process of FIG. 2, absent cryogenic cooling, was carried out on mechanically and chemically prepared steel twist drills as follows:

| | |
|---|---|
| Deposition bath | 30 g./l. NiCl$_2$.6H$_2$O |
| | 40 g./l. NaOH |
| | 60 g./l. C$_2$H$_3$(NH$_2$)$_3$ |
| | 0.5 g./l. NaBH$_4$ (with small amount of Tl$_2$SO$_4$ stabilizer) |
| Temperature | Approx. 90° C. |
| Deposition Rate | Approx. 0.6 mils/hr. |
| Time of Step 6-6' of FIG. 2 | 10 minutes (0.07 mil thick deposition; approx. 20% porosity) |
| Temperature of Step 8 | 650° F. |
| Step 10 | Indium (0.03 mil thick plating) |
| Step 12 | Polytratrafluoroethylene (0.01 mil) |
| Step 14 | 325° F. (one hour) |
| Step 16 | 580° F. |

The resultant 0.07 mil Ni-B coating merged with the indium-organic coating produced about 70 Rockwell hardness.

In comparison tests between high speed steel drills (helical, 3/16 inch, 1¼ inch drilling depth) coated in accordance with the invention and carbide-tipped drills, run over a ten-shift period, holes per drill without resharpening averaged 2,200 with the invention versus 900 for carbides. Unlike the carbide drills, none of the drills coated by the process of the invention broke, no guide bushings or spot-facers were damaged or broken, all of the deep holes were drilled well, and in no instance was there lubrication starvation in the horizontal drilling operation. Significantly cooler operation was encountered with the coated drills of the invention. A alculated tool-cost comparison between original production methods using carbide-tipped drills for drilling oil bleeder holes in brake calipers, and the high speed steel drills coated by the invention, showed one-fifth the cost for the latter.

EXAMPLE 2

The process of Example 1 was used, but preceded by step 1 of FIG. 2; i.e. in dry vacuum, cryogenically cooling the steel article before the deposition steps at −320° F. for about 24 hours. Substantial stress relief and load base improvement of the coated article was observed.

EXAMPLE 3

Following the process of Example 1, the process of FIG. 2 was carried out, but applying the cryogenic cooling step (1') described in Example 2 after the tribological coating of steps 6—6' through 16, producing a superior composite wear-resistant coating.

In the drill application, a higher metal removing rate was attainable with such coated drills (of the order of about 20% higher and greater), because of the more rapid flow of chip up the drill flutes and less heat transference—a cooler-running cutting tool.

Resharpening after about 3000 holes was required, as compared with after about 5 holes with uncoated drills in one application.

EXAMPLE 4

The process of Example 1 was applied to gears subsequently used with lubricant. The usual characteristic wear scar patterns were not observed over long periods of operation with the gears coated by the process of the invention.

EXAMPLE 5

The process of Example 1 has been carried out with a shorter period of step 6—6' of about 5 minutes; but while an adherent, porous Ni-B coating was provided that was coated with the indium-organic lubricants, the resultant coating did not appear as strongly adherent or as satisfactory as with the greater time of Example 1.

EXAMPLE 6

The process of Example 2 was applied to end mills (1", two fluted M-7 high speed steel). These end mills were machining 6061-T6 aluminum bar stock. Untreated mills machined about 200 parts before requiring resharpening. End mills treated by the process of the invention ran 500 parts and the mill was still sharp upon completion of the machining run.

EXAMPLE 7

The process of Example 2 was applied to a roughing mill (1"×4½" stub nuckle M-42 high speed steel) machining a titanium alloy. The roughing mill treated by the process of the invention ran 4 times the number of parts as the untreated roughing mill.

In addition to increasing tool life, another benefit was derived from the treated roughing mill. Its greated lubricity caused the treated roughing mill to require less horsepower; therefore, not overloading the machine tool with increased metal removal rate. The untreated roughing mill, run at the same metal removal rate, overloaded the machine tool thereby shutting it off and not allowing the machining operation to continue. The treated roughing mill, by reducing the load on the machine tool, resulted in a much higher metal removal rate. During this test, the machine tool was run at its peak capacity for feeds and speeds.

EXAMPLE 8

The process in Example 2 was applied to slitter blades (4⅛"×3/64" thick, carbon steel). The slitters were cutting a laminate of aluminum foil, polyester film, and a lacquer coating. Untreated slitters ran up to 5 days between sharpenings. The treated slitters ran for 65 days without sharpening and were still cutting clean at end of job run.

EXAMPLE 9

The process of Example 2 was applied to taps (⅜" 24 H-3 Bottom Tap) made from M-3 high speed steel machining a 9310 steel alloy. The 9310 alloy steel contained hard spots and resulted in a high use rate on taps. The user had tried all commercially available taps and the best produced 45–60 holes.

Taps of the superior type were treated with the process of Example 2 and subsequently run in comparison with untreated taps of the same type. The results showed the untreated taps getting approximately 50 holes as normally expected. The treated taps showed approximately 320 holes or 6.4 times increase in tool life.

The invention thus provides an extremely durable solid film lubricant that significantly improves metal-to-metal slip/slide applications The coated part can be used with oils and greases to increase life, to reduce boundary friction and to improve the effects of hydrodynamic-lubricants. Examples in addition to the beforementioned drills and gears are cutting tools for both light and heavy manufacturing, punches, dies, and piston rods and the like.

In providing this new and durable treatment for cutting tools, the invention enables increase in the service life and productivity of many grades and types of tools, improving the mechanical properties of the base alloy. It also alters the surface chemistry, in a tribological way, by enhancing the inherent boundary lubrication properties of the base alloy without altering either tool dimensions or original base hardness. The process promotes cost savings in such applications by increases in metal removal rate, extension of tool life, lengthening of time between sharpenings, reduction in production downtime, and reduction in tool edge-removal during sharpening.

Tool failures are often attributed to wear, excessive tip temperature and the chipping or fatigue of the cutting edge. It is also documented that the combined effects of friction, stress, tool/work-temperature and base metal integrity do more to cause tool failure than does any other single factor.

The use of the process of the invention lessens the effect of these combined wear factors by reducing the friction at the chip-to-tool interface with the tool temperature being lowered; holding the cutting edge longer with the stress required to shear the metal being reduced; improving tool lubricity as the chips flow smoothly through the flutes and reduce the load on the tool; increasing metallurgical integrity while reducing much chipping of the cutting edge and lessening fatigue factors; and decreasing overall tool temperature, thus inhibiting tempering wear due to tool softening.

Advantages of the invention accordingly reside in increased tool life ranging from 60% to 1000% (normally, the larger the tool the greater the percentage of increase); in the treatment lasting the life of the tool, with resharpened tools repeatedly outperforming untreated tools; in improved productivity through higher metal removal rates and reduced downtime for tool changes; in reduced waste due to broken tools or degraded surface finishes; and in improved machined surfaces and a reduction of burrs.

Further modifications will occur to those skilled in the art and are considered to fall within the spirit and scope of the invention as defined in the appended claims; it being understood that where only a portion of the process of the invention is desired this also may be used beneficially, as before indicated.

What is claimed is:

1. A process for imparting improved wearing and friction-resistant surfaces to metallic articles and the like, that comprises, immersing an article surface in a catalytic nucleation plating bath containing a nickel salt and a borohydride reducing agent and controlling the plating to effect a nickel-boron coating at a deposition rate of the order of about half to a few mils per hour; discontinuing the plating nucleation at a fraction of an hour where the coating has adhered to said article surface as a coating of thickness not exceeding 0.09 mil, and still retains voids that provide a porosity of the order of about 20% to 50% more or less to provide a porous surface; heat-treating said surface; electrodepositing upon the said porous surface a deposit of a metal that is substantially softer than said coating and of thickness less than said coating; applying a dry lubricant material to the porous surface; further heat-treating the same to diffuse the softer metal therethrough and to cause the lubricant material and softer metal to flow in molten combined form within the voids of and over the total area of the porous surface, merging therewith; and cooling the article.

2. A process as claimed in claim 1 and in which said surface is cooled by cryogenic cooling before the deposition of the nickel-boron coating to relieve stresses for improving the load base of the article.

3. A process as claimed in claim 2 and in which cryogenic cooling is effected at a temperature of the order of about −320° F.

4. A process as claimed in claim 1 and in which said cooling step is a cryogenic cooling effected after said further heat-treating step to improve the properties of the combined nickel-boron and softer metal lubricant coating.

5. A process as claimed in claim 1 and in which the further heat-treating is effected first at a relatively low temperature to melt and diffuse the softer metal into the said porous surface and then at a relatively high temperature sufficient to melt the lubricant material to cause a merging of the softer metal and lubricant material together and with the porous surface.

6. A process as claimed in claim 5 and in which said softer metal is indium and said organic lubricant material is polytetrafluoroethylene.

7. A process as claimed in claim 6 and in which said relatively low temperature is of the order of about 325° F. and said relatively high temperature is of the order of about 580° F.

8. A process as claimed in claim 5 and in which said relatively low temperature is applied for about an hour before running up to said relatively high temperature.

9. A process as claimed in claim 1 and in which said first-named heat-treating step is effected at a temperature of the order of about 650° F.

10. A process for imparting improved wearing and friction-resistant surfaces to metallic articles and the like, that comprises immersing an article surface in a catalytic nucleation plating bath containing a salt selected from nickel and cobalt and a reducing agent sleected from borohydride and phosphorus salts and controlling the plating to effect a coating at a deposition rate of the order of about half to a few mils per hour; discontinuing the plating nucleation at a fraction of an hour where the coating has adhered to said article surface as a coating of thickness not exceeding 0.09 mil, and still retains voids that provide a porosity of the order of about 20% to 50% more or less to provide a porous surface; heat-treating said surface; electrodepositing upon the said porous surface a deposit of a metal that is substantially softer than said coating and of thickness less than said coating; applying a dry lubricant material to the porous surface; further heat-treating the same to diffuse the softer metal therethrough and to cause the lubricant material and softer metal to flow in molten combined form within the voids of and over the total area of the porous surface, merging therewith; and cooling the article.

11. A process for imparting improved wearing and friction-resistant surfaces to metallic articles and the like, that comprises, immersing an article surface in a catalytic nucleation plating bath containing a nickel salt and a borohydride reducing agent and controlling the plating to effect a nickel-boron coating at a deposition rate of the order of about half to a few mils per hour; discontinuing the plating nucleation at a fraction of an hour where the coating has adhered to said article surface as a coating of thickness not exceeding 0.09 mil, and still retains voids that provide a porosity of the order of about 20% to 50% more or less to provide a porous surface; heating-treating said surface; electrodepositing upon said porous surface a metal that is substantially softer than said coating and of a thickness less than that of said coating; further heat-treating the porous surface to diffuse the softer metal therethrough and to cause the softer metal to merge therewith; and cooling the article.

12. A process as claimed in claim 11, further comprising applying to said porous surface, prior to said further heat-treating, a dry lubricant material that forms a layer of a thickness less than the thickness of the softer metal deposit.

13. A process as claimed in claim 12 and in which said nickel-boron coating is of a thickness of about 0.07 mils, and said softer metal-dry lubricant forms a layer of a thickness of from about 0.01 to 0.04 mils.

14. A process for imparting improved wearing and friction-resistant surfaces to metallic articles and the like, that comprises immersing an article surface in a catalytic nucleation bath containing a salt selected from nickel and cobalt and a reducing agent selected from borohydride and phosphorus and controlling the plating to effect a coating at a deposition rate of the order of about half to a few mils per hour; discontinuing the plating nucleation at a fraction of an hour where the coating has adhered to said article surface as a coating of thickness not exceeding 0.09 mil, and still retains voids that provide a porosity of the order of about 20% to 50% more or less to provide a porous surface; heat-treating said surface; electrodepositing upon the said porous surface a metal that is substantially softer than said coating and of a thickness less than that of said coating; further heat-treating the porous surface to diffuse the softer metal therethrough and to cause the softer metal to merge therewith; and cooling the article.

15. A process as claimed in claim 14, further comprising applying to said porous surface, prior to said further heat-treating, a dry lubricant material that forms a layer of a thickness less than the thickness of the softer metal deposit.

* * * * *